US007436317B2

(12) United States Patent
Becke et al.

(10) Patent No.: US 7,436,317 B2
(45) Date of Patent: Oct. 14, 2008

(54) ELECTRIC DEVICE WITH A USER GUIDE

(75) Inventors: Christoph Becke, Stephanskirchen (DE); Martin Mueller, Munich (DE)

(73) Assignee: BSH Bosch und Siemens Hausgeraete, Munich (DE)

( * ) Notice: Subject to any disclaimer, the term of this patent is extended or adjusted under 35 U.S.C. 154(b) by 70 days.

(21) Appl. No.: 10/579,708

(22) PCT Filed: Nov. 24, 2004

(86) PCT No.: PCT/EP2004/053072

§ 371 (c)(1),
(2), (4) Date: May 19, 2006

(87) PCT Pub. No.: WO2005/052969

PCT Pub. Date: Jun. 9, 2005

(65) Prior Publication Data

US 2007/0069915 A1 Mar. 29, 2007

(30) Foreign Application Priority Data

Nov. 26, 2003 (DE) ................................ 103 55 138

(51) Int. Cl.
*G08B 5/36* (2006.01)
*G01K 13/00* (2006.01)
*A47F 3/04* (2006.01)

(52) U.S. Cl. ........................ 340/815.48; 62/129; 62/246

(58) Field of Classification Search ................................ 340/815.41–815.92, 686.1, 944, 686.6; 62/125–131, 62/246; 236/1 B
See application file for complete search history.

(56) References Cited

U.S. PATENT DOCUMENTS

| | | | | |
|---|---|---|---|---|
| 4,447,692 | A | 5/1984 | Mierzwinski | |
| 5,099,193 | A * | 3/1992 | Moseley et al. | 323/324 |
| 5,487,276 | A * | 1/1996 | Namisniak et al. | 62/125 |
| 5,493,868 | A * | 2/1996 | Kikuiri et al. | 62/129 |

(Continued)

FOREIGN PATENT DOCUMENTS

DE 101 18 520 1/2002

OTHER PUBLICATIONS

International Search Report PCT/EP2004/053072.

(Continued)

*Primary Examiner*—George A Bugg
*Assistant Examiner*—Jennifer Mehmood
(74) *Attorney, Agent, or Firm*—Russell W. Warnock; James E. Howard

(57) ABSTRACT

An electric device comprising a plurality of operating elements which can be operated by a user. Said device is associated with a status display device, and it also comprises a control logic unit which is coupled to the operating elements in order to detect user operations and which is adjusted. Furthermore, the electric device has an operational state which corresponds to the user operations which are to be adjusted. In a first state, the control logic unit displaces the status display of each operational element, from which it is able to process a user operation, according to an adjusted operational state, and in a second state, said unit displaces the status display of each operational element, whereby it is not possible to process a user operation, according to an adjusted operational state.

18 Claims, 1 Drawing Sheet

U.S. PATENT DOCUMENTS

| | | | | |
|---|---|---|---|---|
| 6,104,319 | A * | 8/2000 | Shpater | 341/23 |
| 6,295,004 | B1 * | 9/2001 | Burnett | 340/686.1 |
| 6,393,848 | B2 * | 5/2002 | Roh et al. | 62/126 |
| 6,405,544 | B2 * | 6/2002 | Hiraoka et al. | 62/127 |
| 6,408,634 | B1 * | 6/2002 | Choi | 62/127 |
| 6,429,542 | B1 | 8/2002 | Furuya et al. | |
| 6,970,726 | B2 * | 11/2005 | Takayanagi | 455/574 |
| 7,000,849 | B2 * | 2/2006 | Ashworth et al. | 236/94 |
| 7,156,167 | B2 * | 1/2007 | Errington et al. | 165/203 |
| 2002/0029575 | A1 * | 3/2002 | Okamoto | 62/125 |
| 2003/0202337 | A1 * | 10/2003 | Yin et al. | 362/29 |
| 2004/0262410 | A1 * | 12/2004 | Hull | 236/91 R |

OTHER PUBLICATIONS

IBM, Design for Dynamically Lighting a Keyboard, IBM Technical Disclosure Bulletin, Oct. 1, 1992, pp. 341-342, vol. 35 No. 5, IBM Corp. New York, US, abbreviated version.

* cited by examiner

ELECTRIC DEVICE WITH A USER GUIDE

The present invention relates to an electric device comprising a plurality of operating elements which can be operated by a user, each having an associated status display device, and comprising a control logic unit which is coupled to the operating elements to detect user operations and is set up to adjust an operating state of the refrigerating appliance according to the user operations.

BACKGROUND

Complex versatile control logic units based on micro-processors or micro-controllers allow electrical appliances to be equipped with a plurality of functions which aim to enhance the operating comfort of the appliance but which as a result of their diversity, are perceived by many users more as confusing than as facilitating handling.

If each possible function is allocated its own button, this rapidly results in a complex diversity of buttons on the appliance so that a user must first search for the corresponding button to activate a desired function. This is not very convenient and is also expensive because of the large number of buttons.

The alternative is to allow the selection of a desired function by successive actuation of several buttons. The number of buttons required is thereby reduced but this can easily become confusing for a user since not every combination of button actuations results in a meaningful result and there can be intermediate states in which the control logic unit expects the actuation of certain buttons to be able to adjust a function and possibly ignores other button actuations.

In electrical appliances it is also usual to use operating elements with an allocated status display. In the simplest case, this can be a mains switch with a built-in light, for example, which is switched on when the appliance is operating and which is switched off when it is not operating or conversely. Such a status display makes it easy for a user to identify an adjusted operating state on an electrical appliance but in no way simplifies the adjustment of a desired operating state.

SUMMARY

It is the object of the present invention to provide an electrical appliance of the type described above which can have a plurality of operating states and actively facilitates the selection of an operating state for a user and allows operating errors to be avoided.

The object is solved by an electrical appliance having the features of claim 1.

Whereas in the case of an operating element with a status display device, the status display device is usually used to display the status “actuated” or “not actuated” of the operating element, the present invention uses such a status display device to display to the user the status “actuatable” or “non-actuatable” of the relevant operating element under the control of the control logic unit, i.e., in order to indicate whether the electric device is in a state in which it can respond to the actuation of a certain operating element or not. Thus, when selecting an operating element to be actuated, the user can restrict themselves to those which can actually be actuated and thus easily complete an adjustment process which requires the successive actuation of a plurality of operating elements.

The status display device preferably comprises a light source for illuminating the allocated operating element.

It is appropriate if the operating elements are arranged behind a closed surface of the housing of the electric device. Firstly, this makes the electric device easy to clean without the risk of the operating elements being impaired. Secondly, the closed surface allows an operating element in the second state to recede visually strongly compared with an operating element in the first state or to make it more or less invisible. For this purpose, in the case of a luminous status display device, the illuminated state should more appropriately be the first state of each status display device.

In order to be inconspicuous, a non-illuminated operating element should have the colour of the surface of the housing surrounding it.

In order to save energy in the case of a luminous status display device, the control logic unit is furthermore more appropriately set up to switch over all illuminated status displays into the non-illuminated state with a pre-determined delay after detecting the last actuation of an operating element.

This switchover should more appropriately be made undoable if the actuation of an arbitrary operating element is detected.

Particularly considered as operating elements are capacitive proximity sensors which are able to detect if a person touches an area of the surface of the housing allocated to respectively one operating element.

If the electric device has an interior chamber which can be closed by a door, especially if the opening and closing of the door pertains to the intended use of the appliance, as is the case for example in a baking oven, a dishwasher, a washing machine, a laundry drier, a freezer or a refrigerator, it is also appropriate that the switchover into the non-illuminated state is made undoable when the opening of the door is detected. Thus, the operating elements which can be actuated are always displayed to a user who opens the door.

The electric device can also be fitted with an acoustic signal transmitter which delivers an audible signal when a handling of the operating element has been detected. This is particularly appropriate in the case of operating elements which are moved only slightly or not at all during operation, such as the afore-mentioned capacitative proximity sensors for example and wherein a user thus cannot immediately detect whether a handling of the operating element has been perceived by the device.

The operating elements are preferably combined with an alphanumeric device in an assembly. This display can indicate information supporting the operation of the device, optionally adapted to a current operating state of the device in the same way as the state of the individual status display devices and/or measured values of operating parameters of the electric device. Any illumination of the alphanumeric display can be switched on and off depending on a detected handling of an operating element or optionally a movement of the door in the same way as the status display devices of the operating elements.

Further features and advantages of the invention are obtained from the following description of an exemplary embodiment with reference to the appended figures. In the figures:

DETAILED DESCRIPTION

Figure 1:
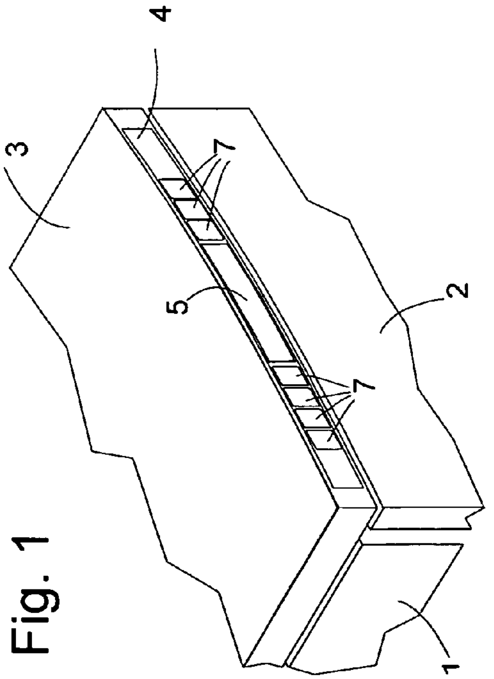
FIG. 1 is a perspective view of a detail of a refrigerating appliance according to the invention.

FIG. 1 shows a section of the housing of a refrigerator in table design which is considered here as an example for an electric device according to the invention. The housing of the refrigerator is substantially constructed of a body 1, a door 2 pivotally attached to the body 1, which together with the body 1 encloses a heat-insulated interior chamber, and a cover plate 3 which closes the housing at the top. The cover plate 3 is hollow inside and the cavity is closed by a control panel 4 towards the front. The control panel 4 is an elongated flat strip of transparent plastic whose back is coated with a dark colour over most of its surface so that it is impermeable to light.

Figure 2:
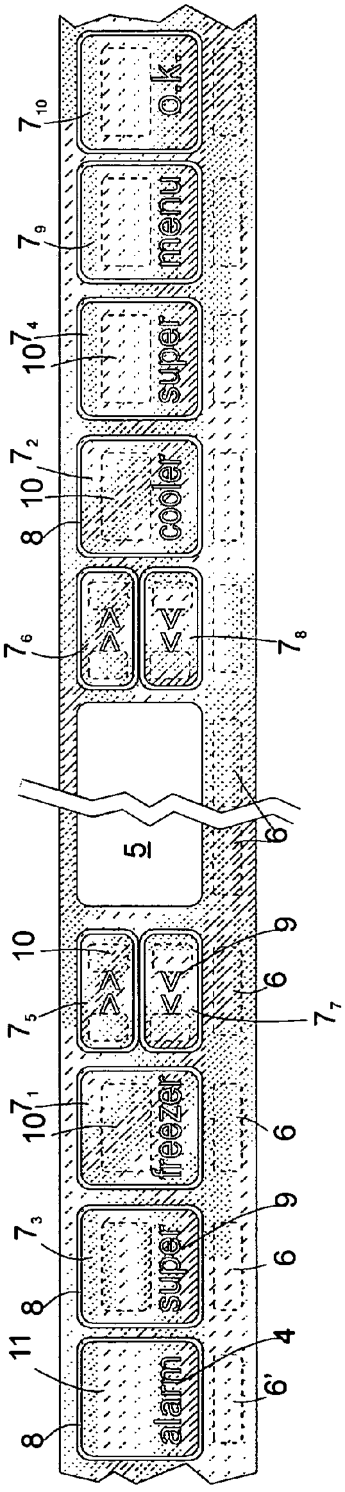
FIG. 2 is a section from a control panel of the refrigerating appliance from FIG. 1.

FIG. 2 shows a section of the control panel 4. Located behind a large-area window 5 in which the dark coloured layer is omitted, is an LCD display and behind the LCD display, approximately parallel to the control panel 4, is a luminescent screen. Light sources 6 for irradiating the luminescent screen and making the LCD display visible are located at one edge of the luminescent screen, covered by the dark colour of the control panel at the front and thus shown as a dashed outline in the figure.

Located on both sides of the window 5 are a plurality of operating elements or buttons 7 on the control panel 4. The buttons 7 are each defined by a frame-shaped recess 8 in the dark-coloured layer used as backing for the control panel 4. A lettering 9 which describes the function of the buttons 7 is formed in a suitable fashion by recessing the letter in the dark coloured layer. Each button 7 has a capacitive proximity sensor 10 attached to the back of the control panel 4 and concealed by the coloured layer, shown as a dashed outline in the figure, which serves to detect any contact of the corresponding button 7 by a user.

The luminescent screen extends as far as behind the buttons 7 and located adjacent to these are light sources 6 concealed from direct view by the coloured layer, in order to irradiate the luminescent screen behind the buttons 7 and thus illuminate their frame 8 and lettering 9 in each case.

The proximity sensors 10 are connected to a control logic unit (not shown) concealed behind the control panel 4, which controls the operation of the refrigerating appliance and the LCD display and the light sources 6.

Also connected to the control logic unit is a door opening switch with the aid of which the control logic unit controls an interior lighting of the refrigerating appliance in a manner known per se according to the state, open or closed, of the door 2.

An alarm signal generator 11 is integrated in the control panel 4 in a row with the buttons 7. Like the buttons 7, it has a frame 8 and lettering 9 which are recessed in the coloured layer and have a light source 6' whose colour preferably red is different to that of the light sources 6.

In a combination refrigerating appliance comprising a normal refrigerating compartment and a freezing compartment, for each compartment there can be provided, for example, an on/off button $\mathbf{7}_1$, $\mathbf{7}_2$ for switching on or switching off the refrigeration of the relevant compartment, a button $\mathbf{7}_3$, $\mathbf{7}_4$ for activating a high-power refrigerating mode, an increment button $\mathbf{7}_5$, $\mathbf{7}_6$ and a decrement button $\mathbf{7}_7$, $\mathbf{7}_8$. Also provided is a menu button $\mathbf{7}_9$ and an O.K. button $\mathbf{7}_{10}$.

In a rest state all light source 6, 6' are switched off. The luminescent screen is dark and the recessed areas 8, 9 of the cover layer barely differ in their shade and brightness visible for a user from the dark coloured layer itself. In this state, the buttons 7 are barely identifiable for a user.

When the door opening switch registers an opening of the door or any one of the proximity sensors 10 registers a contact, the control logic unit goes from the rest state into a readiness state by switching on the light sources 6 at the window 5 so that the LCD display can be read off, indicating the measured temperatures in the refrigerating compartments. In addition, the control logic unit switches on the light sources 6 of all the buttons except for the O.K. button $\mathbf{7}_{10}$. If the increment or decrement button of the normal refrigerating compartment or the freezing compartment is touched, the control logic unit responds by displaying a text line "adjust freezing compartment temperature" or "adjust refrigerating compartment temperature" and indicating an ordered list of adjustable temperatures among which that currently set is emphasised, in the LCD display and the O.K. button $\mathbf{7}_{10}$ is illuminated. The control logic unit reacts to any further contact of the increment or decrement buttons allocated to the selected refrigerating compartment by raising or lowering the desired temperature for the relevant compartment by a single stage and indicating the value now selected on the LCD display. By touching the O.K. button $\mathbf{7}_{10}$ the user can end the adjustment process, the control logic unit takes over the emphasised indicated value as the new desired value of the temperature for the relevant compartment and returns to the previous readiness state.

If the user now touches the on/off button $\mathbf{7}_1$, $\mathbf{7}_2$ or the fast-freeze mode button $\mathbf{7}_3$, $\mathbf{7}_4$, the relevant command is directly processed by the control logic unit and the state, illuminated or non-illuminated, of the individual buttons does not change.

If the user touches the menu button $\mathbf{7}_9$, the control logic unit displays a name of the first menu item on the LCD display, switches on the illumination of the increment and decrement buttons $\mathbf{7}_5$, $\mathbf{7}_6$ or $\mathbf{7}_7$, $\mathbf{7}_8$ and the O.K. button $\mathbf{7}_{10}$ and switches off that of all the other buttons. By touching the increment or decrement buttons, the user can scroll forwards and backwards through a list of menu items and display the description of a respectively selected menu item in the LCD display.

A menu item for example comprises storage instruction. If this menu item is selected, a list of the letters of the alphabet appears first on the LCD display and the user can selected a letter using the increment and decrement button and confirm with the O.K. button $\mathbf{7}_{10}$. Thereupon, the control logic unit displays a designation of a foodstuff beginning with the selected letter and information on its recommended storage time in the freezing compartment on the LCD display; other foodstuffs beginning with the same letter can be selected in turn using the increment and decrement buttons. By again pressing the menu button $\mathbf{7}_9$, the menu item "storage instructions" is left and the selection state in which the user can select a further menu item is restored.

A further menu item can be the display of the room temperature if the refrigerating appliance is fitted with a sensor for this. The detected temperature is simultaneously displayed with the designation of the menu item; the increment and decrement buttons for scrolling further in the list of menu items and the menu button $\mathbf{7}_9$ for ending the menu selection mode are illuminated.

A third possible menu item is the adjustment of the brightness of the light sources 6. If this menu item is selected by touching the O.K. button, increment and decrement buttons $\mathbf{7}_5$, $\mathbf{7}_6$ or $\mathbf{7}_7$, $\mathbf{7}_8$ for varying the brightness of the light sources 6, the O.K. button $\mathbf{7}_{10}$ for ending the brightness adjusting mode by taking over any change and the menu button $\mathbf{7}_9$ for ending the adjustment mode by rejecting any change are illuminated and can be actuated.

A fourth menu item for adjusting the loudness of an alarm tone with which the refrigerating appliance draws attention to a fault state in addition to the visual display by the signal transmitter 11 functions in a similar manner.

A fifth possible menu item is the display of a service call number; as in the case of the room temperature, this call number appears directly with the designation of the menu item in the display and merely increment and decrement buttons for scrolling further in the menu and menu button $\mathbf{7}_9$ for ending the menu selection mode are illuminated and can be actuated.

The language of the text messages appearing in the display is considered as the sixth menu item. If this menu item is confirmed by touching the O.K. button $\mathbf{7}_{10}$, the user can successively display supported languages using increment and decrement buttons and can select one of these by touching the O.K. button $\mathbf{7}_{10}$, or leave the selection mode without making any change by touching menu button $\mathbf{7}_9$.

Any touching of a button 7 or opening the door 2 starts an internal timer of the control logic unit which switches off all the light sources 6 and set the control logic unit back to its rest state after a predetermined time interval has elapsed. If a new opening of the door or touch of a button is registered before the time interval predetermined by the time has elapsed, the timer is reset so that the predetermined time interval in each case begins to run anew from this last detection time.

The invention claimed is:

1. An electric appliance, comprising:

a plurality of operating elements, each operating element actuatable by a user in an actuatable state and not actuatable by the user in a non-actuatable state, each operating element including a respective status display device; and a control logic unit coupled to the operating elements, the control logic unit configured to detect a user input, change an operating state of the electrical appliance according to the user input, and activate the status display device of each operating element that is in an actuatable state and deactivate the status display device of each operating element that is in a non-actuatable state in response to a change in the electrical appliance from a first operating state to a second operating state.

2. The electric appliance according to claim 1, wherein each status display device is a light source.

3. The electric appliance according to claim 1, further comprising a housing, the housing including a surface, wherein the operating elements are arranged on the surface.

4. The electric appliance according to claim 1, wherein a status display device is in an illuminated state when a respective operating element is in the actuatable state and the status display device is in a non-illuminated state when the respective operating element is in the non-actuatable state.

5. The electric appliance according to claim 4, further comprising a housing including a surface on which the operating elements are arranged, wherein a status display device in a non-illuminated state has a color similar to a color of the surface.

6. The electric appliance according to claim 4, wherein the control logic unit is further configured to switch each status display device that is in the illuminated state into the non-illuminated state after a pre-determined time interval elapses following detection of the user input.

7. The electric appliance according to claim 5, wherein the control logic unit is further configured to maintain in the non-illuminated state the status display devices for the operating elements that are in the non-actuatable state, if the user attempts to actuate an operating element in the non-actuatable state.

8. The electric appliance according to claim 1, wherein the operating elements comprise capacitive proximity sensors.

9. The electric appliance according to claim 1, further comprising an acoustic signal transmitter that delivers an audible signal when an actuation of an operating element has been detected.

10. The electric appliance according to claim 1, wherein the operating elements are combined with an alphanumeric display in an assembly.

11. The electric appliance according to claim 1, wherein the electric appliance includes a refrigerating appliance.

12. A refrigerator comprising:

a housing having an interior chamber;

a door coupled to the housing for opening and closing the interior chamber;

a control panel, the control panel including a display window for displaying information and a plurality of buttons for receiving input from a user;

each button including a respective light source and a respective proximity sensor, the proximity sensor configured to detect contact of the button by the user;

each respective light source being in an illuminated state when the button is actuatable by the user and in a non-illuminated state when the button is not actuatable by the user; and a control logic unit electrically connected to the control panel, the control logic unit configured to control operation of the refrigerator, receive input signals from the buttons, send output signals to control the display window and light sources, adjust an operating state of the refrigerator in response to a user input, and activate the light source of at least a first button into the illuminated state and deactivate the light source of at least a second button into the non-illuminated state in response to the user input.

13. The refrigerator according to claim 12, wherein the housing includes:

a freezer compartment including the first button, wherein the first button is for controlling the freezer compartment; and a refrigerating compartment including the second button, wherein the second button is for controlling the refrigerating compartment.

14. The refrigerator according to claim 12, wherein the buttons include a select button for selecting an operating feature, an increment button for increasing the selected operating feature, and a decrement button for decreasing the selected operating feature.

15. The refrigerator according to claim 12, wherein the display window is configured to display a list of operating features and allow the user to scroll through the list of operating features.

16. The refrigerator according to claim 12, wherein the display window includes an LCD display and a luminescent screen.

17. The refrigerator according to claim 12, further comprising a door switch, the door switch coupled to the control logic unit and configured to sense if the door is open.

18. An electric appliance, comprising:

a plurality of operating elements, each operating element actuatable by a user in an actuatable state and not actuatable by the user in a non-actuatable state, each operating element including a respective status display device;

a control logic unit coupled to the operating elements, the control logic unit configured to detect a user input, change an operating state of the electrical appliance according to the user input, and activate the status display device of each operating element that is in an actuatable state and deactivate the status display device of each operating element that is in a non-actuatable state in response to a change in the electrical appliance from a first operating state to a second operating state, wherein a status display device is in an illuminated state when a respective operating element is in the actuatable state and the status display device is in a non-illuminated state when the respective operating element is in the non-actuatable state, the control logic unit is further configured to switch each status display device that is in the illuminated state into the non-illuminated state after a pre-determined time interval elapses following detection of the user input and the control logic unit is further configured to maintain in the non-illuminated state the status display devices for the operating elements that are in the non-actuatable state, if the user attempts to actuate an operating element in the non-actuatable state; and a housing, the housing including an interior chamber that is closed by a door, wherein the control logic unit is further configured to maintain in the non-illuminated state the status display devices of the operating elements that are in the non-actuatable state, if the door is opened.

* * * * *